(12) United States Patent
Flamary-Mespoulie

(10) Patent No.: US 11,911,997 B2
(45) Date of Patent: Feb. 27, 2024

(54) METHOD FOR OBTAINING A LAMINATED CURVED GLAZING

(71) Applicant: SAINT-GOBAIN GLASS FRANCE, Courbevoie (FR)

(72) Inventor: Florian Flamary-Mespoulie, Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/247,709

(22) PCT Filed: Oct. 6, 2021

(86) PCT No.: PCT/FR2021/051735
§ 371 (c)(1),
(2) Date: Apr. 3, 2023

(87) PCT Pub. No.: WO2022/074333
PCT Pub. Date: Apr. 14, 2022

(65) Prior Publication Data
US 2023/0286253 A1 Sep. 14, 2023

(30) Foreign Application Priority Data
Oct. 9, 2020 (FR) ...................................... 2010349

(51) Int. Cl.
*B32B 17/10* (2006.01)
*B32B 1/00* (2006.01)
(Continued)

(52) U.S. Cl.
CPC .......... *B32B 17/10348* (2013.01); *B32B 1/00* (2013.01); *B32B 17/10036* (2013.01);
(Continued)

(58) Field of Classification Search
CPC ................ B32B 17/10348; B32B 1/00; B32B 17/10036; B32B 17/10174;
(Continued)

(56) References Cited

FOREIGN PATENT DOCUMENTS

CN 104220390 A 12/2014
DE 43 16 575 C1 7/1994
(Continued)

OTHER PUBLICATIONS

Written Opinion of the International Searching Authority as issued in International Patent Application No. PCT/FR2021/051735, dated Feb. 8, 2022.

(Continued)

*Primary Examiner* — George R Koch
*Assistant Examiner* — Christopher C Caillouet
(74) *Attorney, Agent, or Firm* — Pillsbury Winthrop Shaw Pittman LLP

(57) ABSTRACT

A method for obtaining a laminated curved glazing, particularly for a motor vehicle windscreen or roof. The method includes the deposition (b) of an enamel layer on a stack of thin layers deposited on a first glass sheet as well as the deposition (c), at least on the enamel layer, of refractory particles based on oxides, of metals or carbides, at least one dimension of which is larger than 30 µm. The stack of thin layers is completely dissolved by the enamel layer at the end of a bending procedure (d) carried out before laminating (e) the first glass sheet with an additional glass sheet by a lamination interlayer.

20 Claims, 4 Drawing Sheets

(51) Int. Cl.
    *B60J 1/00*     (2006.01)
    *C03C 17/00*     (2006.01)
    *C03C 17/36*     (2006.01)

(52) U.S. Cl.
    CPC .. *B32B 17/10174* (2013.01); *B32B 17/10761* (2013.01); *B32B 17/10889* (2013.01); *B60J 1/001* (2013.01); *C03C 17/007* (2013.01); *C03C 17/3626* (2013.01); *C03C 17/3644* (2013.01); *C03C 17/3649* (2013.01); *B32B 2255/20* (2013.01); *B32B 2307/202* (2013.01); *B32B 2307/4026* (2013.01); *B32B 2307/41* (2013.01); *B32B 2307/412* (2013.01); *B32B 2307/7376* (2023.05); *B32B 2605/006* (2013.01); *C03C 2217/21* (2013.01); *C03C 2217/74* (2013.01); *C03C 2217/948* (2013.01); *C03C 2218/119* (2013.01)

(58) Field of Classification Search
    CPC ........ B32B 17/10761; B32B 17/10889; B32B 2255/20; B32B 2307/202; B32B 2307/4026; B32B 2307/41; B32B 2307/412; B32B 2307/7376; B32B 2605/006; B60J 1/001; C03C 17/007; C03C 17/3626; C03C 17/3644; C03C 17/3649; C03C 2217/21; C03C 2217/74; C03C 2217/948; C03C 2218/119
See application file for complete search history.

(56) References Cited

FOREIGN PATENT DOCUMENTS

| WO | WO 00/29346 A1 | 5/2000 |
| WO | WO 2009/026275 A1 | 2/2009 |
| WO | WO 2014/093568 A1 | 6/2014 |
| WO | WO 2014/133929 A2 | 9/2014 |
| WO | WO 2019/106264 A1 | 6/2019 |

OTHER PUBLICATIONS

International Search Report as issued in International Patent Application No. PCT/FR2021/051735, dated Feb. 8, 2022.

[Fig.1]
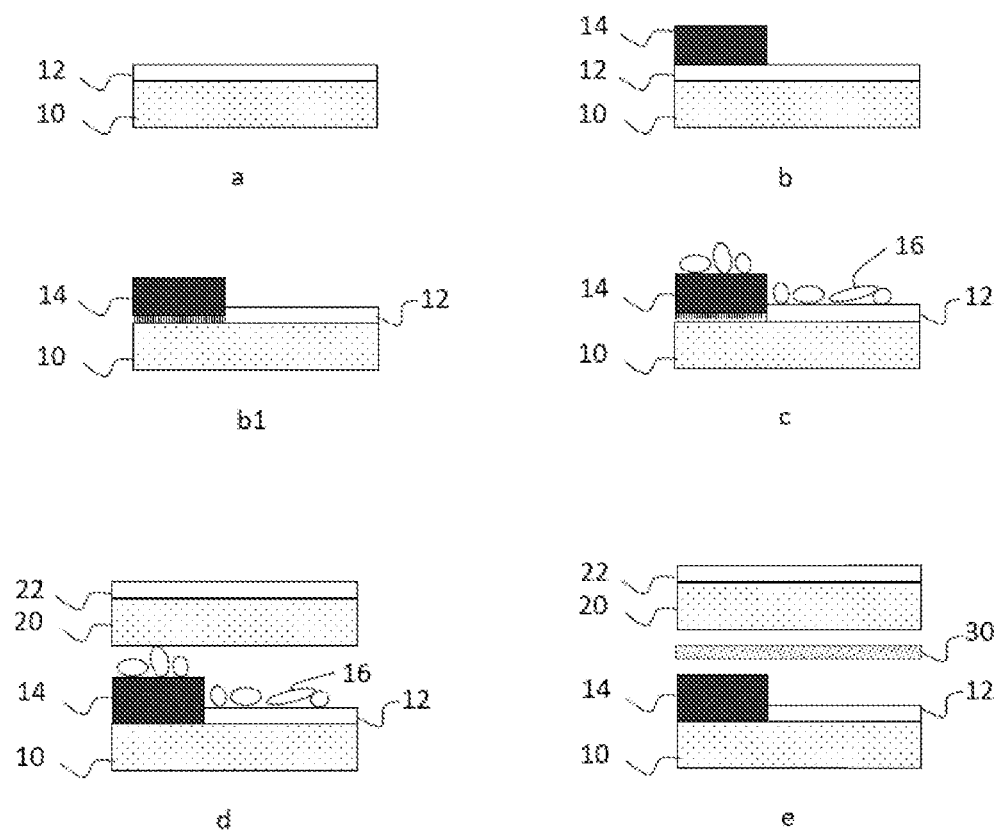

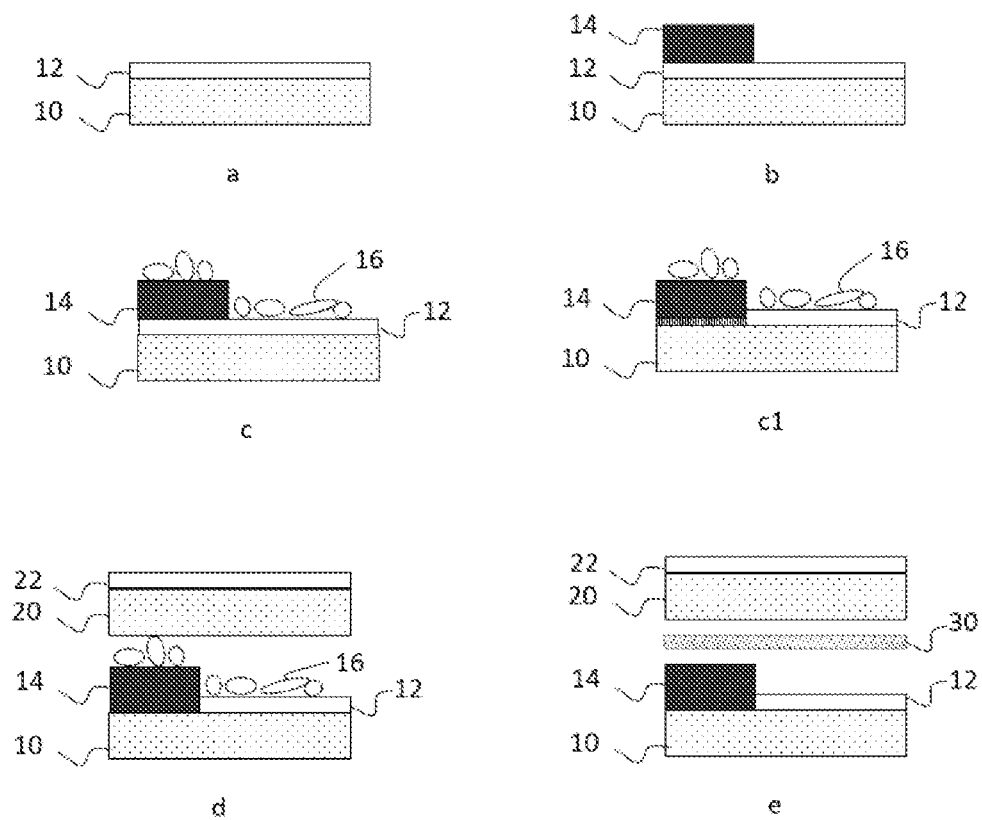
[Fig.2]

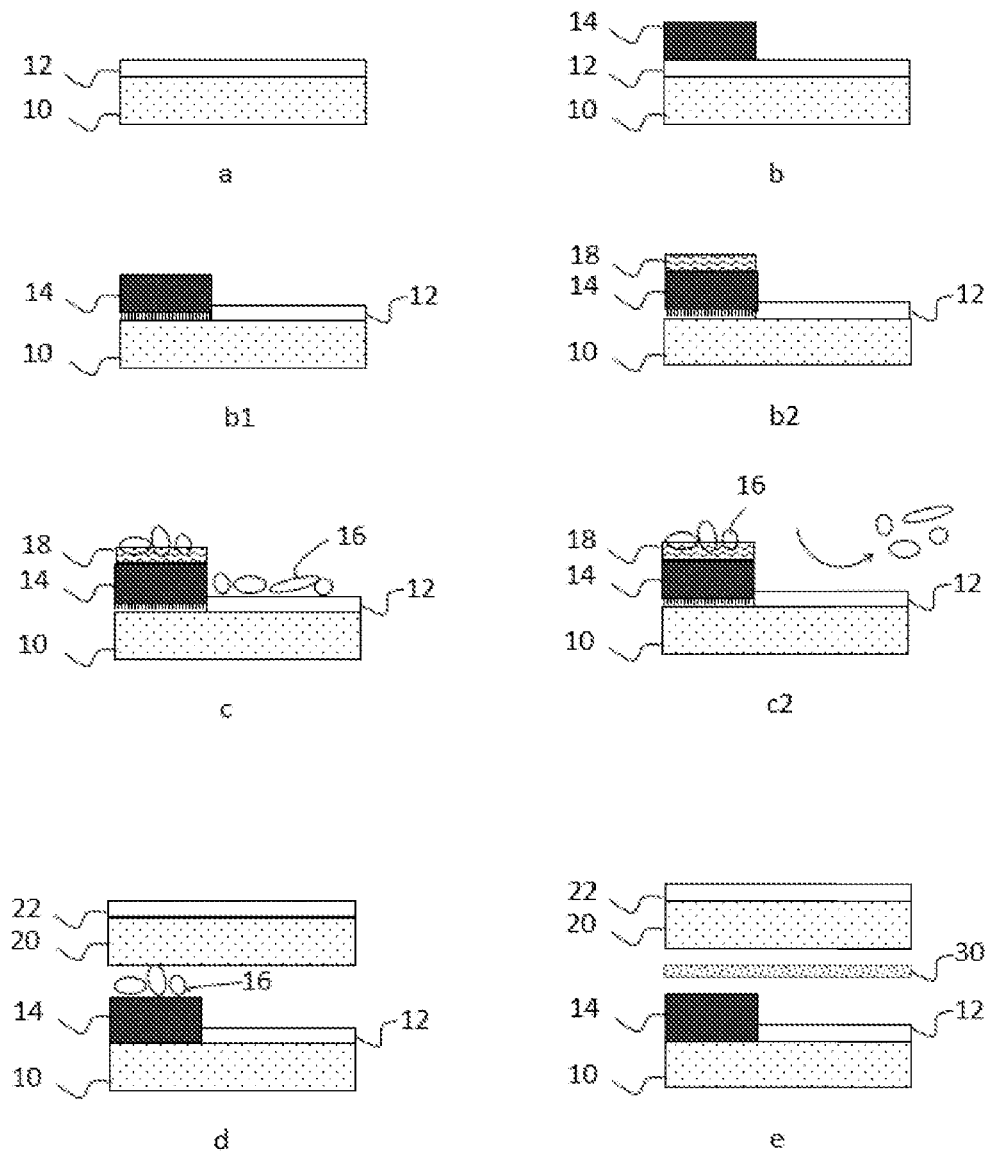
[Fig.3]

[Fig.4]
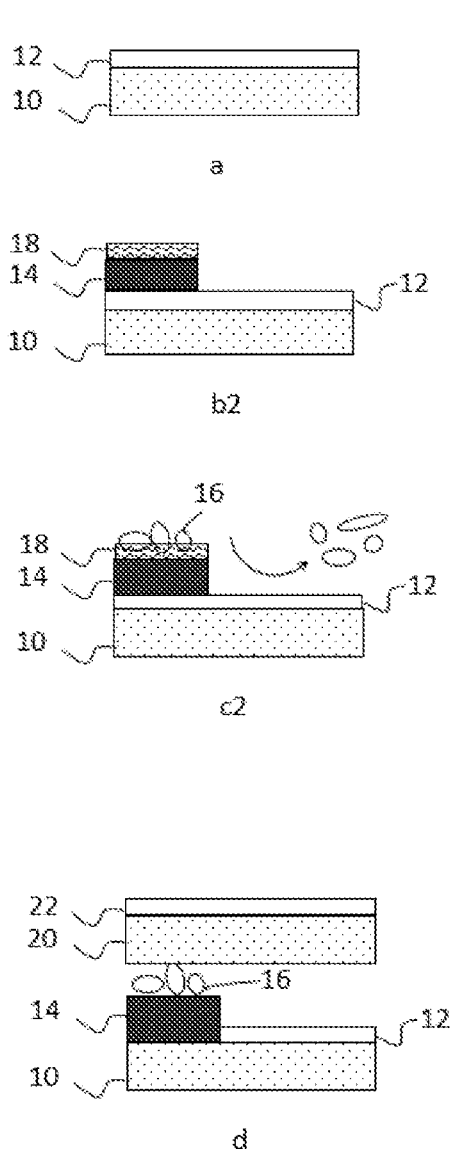
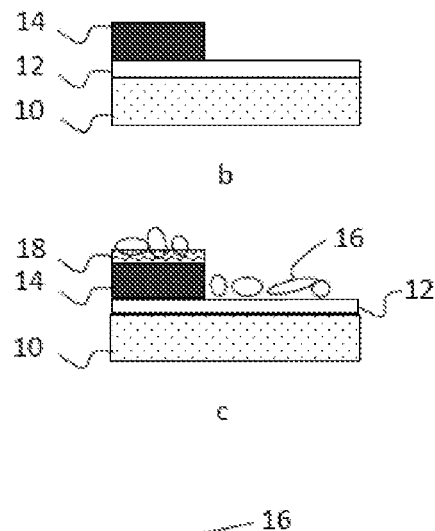

METHOD FOR OBTAINING A LAMINATED CURVED GLAZING

CROSS-REFERENCE TO RELATED APPLICATIONS

This application is the U.S. National Stage of PCT/FR2021/051735, filed Oct. 6, 2021, which in turn claims priority to French patent application number 2010349 filed Oct. 9, 2020. The content of these applications are incorporated herein by reference in their entireties.

The invention relates to the field of laminated curved glazings for motor vehicles, e.g. roofs or windscreens, comprising a glass sheet coated with a stack of thin layers and an enamel layer.

Laminated glazings are glazings in which two glass sheets are adhesively bonded by means of a lamination interlayer. The latter makes it possible in particular to retain shards of glass in the event of breakage, but also provides other functions, in particular in terms of resistance to breaking and entering or improving acoustic properties.

These glazings often comprise coatings of various types, intended to confer different properties.

Enamel layers, generally black and opaque, are often deposited on part of the glazing, usually in the form of a peripheral strip intended to hide, and protect from ultraviolet radiation, the polymer seals used for attaching and positioning the glazing on the window opening of the vehicle body. Enameled zones also hide the zones for attaching the interior rear-view mirror and various connectors and sensors.

In a laminated glazing, these layers of enamel are generally arranged on face 2, with the faces traditionally being numbered starting from the face intended to be positioned on the outside of the vehicle. Face 2 is therefore a face which is in contact with the lamination interlayer. The aesthetic appearance of the enamel layer, viewed from the outside of the vehicle, holds particular importance for car manufacturers. Enamel is generally obtained by firing a composition comprising a glass frit and pigments at above 500° C. A glass frit is composed of fine particles of glass with a low melting point which, under the effect of a firing heat treatment, softens and adheres to the glass sheet. This thus forms a generally opaque mineral layer with high chemical and mechanical resistance, which adheres perfectly to the glass, holding the pigment particles. The firing step is generally carried out simultaneously with the bending of the glass sheet.

In the context of manufacturing laminated glazing, the two glass sheets of the glazing are bent together, with the glass sheet intended to be positioned on the inside of the vehicle generally being arranged above the other glass sheet, which carries the enamel. It is then necessary for the enamel to have non-stick properties in order to prevent any bonding between the two glass sheets during the bending. To this end, enamels containing bismuth are usually employed, i.e. enamels obtained from glass frits containing bismuth oxide.

Coatings, generally in the form of stacks of thin layers, can also be present on one of the glass sheets of the laminated glazing. These may particularly be electrically conductive layers, which can provide two types of functions. Firstly, when current supplies are provided, electrically conductive layers can dissipate heat by the Joule effect. These are then heating layers, of use for example for defrosting or defogging. Secondly, due to their reflection of infrared radiation, these layers have solar control or low-emissivity properties. The layers are thus valued for the improvement in thermal comfort or for the energy savings they provide, by reducing the consumption intended for heating or air conditioning. These stacks of layers are generally arranged on face 3 of the laminated glazing, therefore also in contact with the lamination interlayer.

Nevertheless, in some cases that will be described in detail hereinafter, it may be beneficial to have the enamel layer and the stack of thin layers on the same glass sheet, and therefore on the same face of the glass sheet in question, in order for these coatings to be protected inside the laminated glazing.

However, it has been observed that, when a glass sheet coated with a stack of thin layers required provision with an enamel layer, unwanted interactions may have occurred between the stack and the enamel during the bending, leading particularly to a degradation of the aesthetic appearance of the enamel. It has particularly been observed, especially when the stack contains at least one nitride layer and the enamel contains bismuth, that bubbles were formed within the enamel, close to the interface between the latter and the stack, causing a significant lowering of the adhesion of the enamel, altering the optical appearance thereof (in particular the color on the glass side, i.e. on the side opposite the enamel) and reducing the chemical resistance thereof, in particular to acids.

Several solutions to this problem have been proposed.

It is possible to remove beforehand the stack of thin layers at the locations where the enamel layer is to be deposited, for example by means of abrasives, in order for the enamel to be deposited in direct contact with the glass sheet and to prevent any problems of adhesion between the enamel layer and the stack of thin layers. However, mechanical abrasion produces visible scratches, including on the enamel layer.

The application WO 2014/133929, and prior to it, application WO0029346, proposed the concept of using, for the enamel, special glass frits which, during firing or pre-firing, are capable of dissolving the stack of thin layers in order to become directly attached to the glass. However, such enamels do not have good non-stick properties, causing the two glass sheets to bond together during bending.

The application WO 2019/106264 proposes modifying the stack of thin layers by adding a layer of oxide between the stack and the enamel comprising bismuth. However, it is not always possible to make such a change.

The aim of the invention is to overcome these problems.

To this end, the invention relates to a method for obtaining a laminated curved glazing, particularly for a motor vehicle windscreen or roof, comprising the following steps:

a. providing a first glass sheet, coated on at least part of one of the faces thereof with a stack of thin layers b. a step of depositing, on part of the surface of the stack of thin layers, an enamel layer c. a step of depositing, at least on said enamel layer, refractory particles based on oxides, carbides or metals, at least one dimension of which is greater than or equal to 30 µm, d. a step of simultaneously bending the first glass sheet and the additional glass sheet, with the enamel layer facing said additional glass sheet, e. a step of laminating said first glass sheet with the additional glass sheet, by means of a lamination interlayer, such that the enamel layer is facing said interlayer, said method further comprising a step of pre-firing the enamel layer during which the stack of thin layers under the enamel layer is at least partially dissolved by said enamel layer, said pre-firing step being either a step called b1 and performed between step b and step c or a step called c1 and carried out between step c and step d, the stack of thin layers located under the enamel layer being completely dissolved by said enamel layer at least by the end of step d.

The invention also has as its object a laminated curved glazing, in particular for a windscreen or roof of a motor vehicle, obtained or capable of being obtained by this method.

The dissolution of the thin layer stack by the enamel prevents the above-mentioned interactions. The components of the stack are dissolved in the enamel layer, which is in direct contact with the glass sheet at least after the bending step (step d). The use of refractory particles (deposited in step c) avoids any bonding between the two glass sheets during bending.

In the present text, the stack of thin layers and the enamel layer are collectively called "the coatings".

Step a

The first glass sheet may be flat or curved. The first glass sheet is generally flat during the deposition of the stack of thin layers and then the enamel layer, and is then curved during step d. The first glass sheet is therefore curved in the laminated curved glazing according to the invention.

The glass of the first glass sheet is typically a soda-lime-silica glass, but other glasses, for example borosilicates or aluminosilicates, can also be used. The first glass sheet is preferably obtained by the float method, i.e. by a method consisting of pouring molten glass onto a bath of molten tin.

The first glass sheet may be made of clear glass or tinted glass, preferably of tinted glass, e.g. green, gray or blue. To this end, the chemical composition of the first glass sheet advantageously comprises iron oxide, in a content by weight ranging from 0.5 to 2%. It may also comprise other coloring agents, such as cobalt oxide, chromium oxide, nickel oxide, erbium oxide or else selenium.

The first glass sheet preferably has a thickness within a range extending from 0.7 to 19 mm, particularly from 1 to 10 mm, in particular from 2 to 6 mm, or even from 2 to 4 mm.

The lateral dimensions of the first glass sheet (and the additional glass sheet) should be adapted based on those of the laminated glazing with which it is intended to be integrated. The first glass sheet (and/or the additional glass sheet) preferably has a surface area of at least 1 m$^2$.

The first glass sheet is preferably coated with the stack of thin layers over at least 70%, particularly over at least 90%, or even over the whole of the surface of the face of the glass sheet. Indeed, some zones may not be coated in order particularly to fit communicating windows that allow waves to pass.

The stack is preferably coated with the enamel layer over 2 to 40%, particularly 3 to 30%, or even 5 to 20% of the surface thereof. The enamel layer preferably comprises a peripheral strip, i.e. a self-contained strip which, at any point of the periphery of the first glass sheet, extends inwardly towards the first glass sheet over a certain width, typically between 1 and 20 cm.

The stack of thin layers is preferably in contact with the glass sheet. When being deposited, the enamel layer is preferably in contact with the stack of thin layers.

In the present text, "contact" is intended to mean physical contact. The expression "based on" is preferably intended to mean the fact that the layer in question comprises at least 50% by weight of the material in question, particularly 60%, or even 70% and even 80% or 90%. The layer may even substantially consist of, or consist of, this material. "Substantially consist of" should be understood to mean that the layer may comprise impurities which have no influence on its properties. The terms "oxide" or "nitride" do not necessarily mean that the oxides or nitrides are stoichiometric. Indeed, they may be substoichiometric, superstoichiometric or stoichiometric.

The stack preferably comprises at least one layer based on a nitride. The nitride is particularly a nitride of at least one element selected from aluminum, silicon, zirconium, titanium. It may comprise a nitride of at least two or three of these elements, for example a silicon zirconium nitride or a silicon aluminum nitride. The layer based on a nitride is preferably a layer based on silicon nitride, more particularly a layer consisting substantially of a silicon nitride. When the layer of silicon nitride is deposited by cathode sputtering, it generally contains aluminum because it is common practice to dope silicon targets with aluminum in order to accelerate the deposition rates.

The layer based on a nitride preferably has a physical thickness in a range extending from 2 to 100 nm, particularly from 5 to 80 nm.

The layers based on nitride are commonly used in a large number of stacks of thin layers since they have advantageous blocking properties, in that they prevent the oxidation of other layers present in the stack, particularly functional layers which will be described below.

The stack preferably comprises at least one functional layer, particularly an electrically conductive functional layer. The functional layer is preferably included between two thin dielectric layers, at least one of which is a layer based on nitride. Other possible dielectric layers are for example layers of oxides or oxynitrides.

At least one electrically conductive functional layer is advantageously selected from:
  metal layers, particularly made of silver or niobium, or even gold, and
  layers of a transparent conductive oxide, particularly selected from indium tin oxide, doped tin oxides (for example doped with fluorine or antimony), doped zinc oxides (for example doped with aluminum or gallium).

These layers are particularly valued for their low emissivity, which gives the glazings excellent thermal insulation properties. In glazings equipping land vehicles, particularly motor vehicles, rail vehicles, or else aircraft or marine vessels, low-emissivity glazings make it possible, in hot weather, to outwardly reflect part of the solar radiation, and therefore to limit the heating of the passenger compartment of said vehicles, and where appropriate to reduce air-conditioning costs. Conversely, in cold weather, these glazings make it possible to retain the heat within the passenger compartment, and consequently to reduce the heating energy required. The same applies in the case of glazings equipping buildings.

According to a preferred embodiment, the stack of thin layers comprises at least one layer of silver, particularly one, two, three, or even four layers of silver. The physical thickness of the layer of silver or, where appropriate, the sum of the thickness of the layers of silver, is preferably between 2 and 20 nm, particularly between 3 and 15 nm.

According to another preferred embodiment, the stack of thin layers comprises at least one layer of indium tin oxide. The physical thickness thereof is preferably between 30 and 200 nm, in particular between 40 and 150 nm.

In order to protect the or each electrically conductive thin layer (whether metal or based on transparent conductive oxide) during the bending step, each of these layers is preferably surrounded by at least two dielectric layers. The dielectric layers are preferably based on oxide, nitride and/or oxynitride of at least one element selected from silicon, aluminum, titanium, zinc, zirconium, tin.

At least part of the stack of thin layers can be deposited by various known techniques, for example chemical vapor deposition (CVD), or by cathode sputtering, particularly magnetic-field-assisted (magnetron method).

The stack of thin layers is preferably deposited by cathode sputtering, particularly magnetron sputtering. In this method, a plasma is created in a high vacuum close to a target comprising the chemical elements to be deposited.

By bombarding the target, the active species of the plasma tear off said elements, which are deposited on the glass sheet, forming the desired thin layer. This method is called a "reactive" method when the layer is made of a material resulting from a chemical reaction between the elements torn off from the target and the gas contained in the plasma. The major advantage of this method lies in the possibility of depositing a very complex stack of layers on the same line by making the glass sheet run in succession beneath various targets, generally in the same device.

The abovementioned examples have properties of electrical conduction and infrared reflection which are of use for providing a heating function (defrosting, defogging) and/or a thermal insulation function.

When the stack of thin layers is intended to provide a heating function, supplies of current must be provided. This may particularly be strips of silver paste deposited by screen printing on the stack of thin layers, at two opposite edges of the glass sheet.

Step b

In step b, the enamel layer is preferably deposited from a composition comprising at least one pigment and at least one glass frit. The enamel layer preferably does not comprise lead oxide.

The enamel composition generally further comprises an organic medium, intended to facilitate the application of the composition on the substrate and also the temporary adhesion thereof to same, and which is eliminated during the pre-firing or firing of the enamel. The medium typically comprises solvents, diluents, oils and/or resins.

The pigments preferably comprise one or more oxides selected from oxides of chromium, copper, iron, manganese, cobalt, nickel. These may be, by way of example, copper and/or iron chromates.

Preferably, the glass frit is based on bismuth borosilicate, or even based on bismuth-zinc borosilicate. In order to make it more "aggressive" towards the stack of layers and encourage it to dissolve, the bismuth and/or boron contents are preferably higher than those of the glass frits usually used.

The enamel layer is preferably deposited by screen printing. To this end, a screen printing screen is placed on the glass sheet, which screen comprises meshes, some of which are blocked off, then the enamel composition is deposited on the screen, then a squeegee is applied in order to force the enamel composition through the screen in the zones where the screen meshes have not been blocked off, so as to form a wet enamel layer.

The thickness of the wet enamel layer is preferably between 10 and 30 μm.

In the present text, "enamel composition" is used to describe the liquid composition which is used, during step b, to deposit a wet enamel layer on the glass sheet. The term "enamel layer" is used to describe the layer at each stage of the method, both the wet layer (before pre-firing, if necessary before drying) and the final layer (after firing).

Step b is preferably immediately followed by a drying step, intended to remove at least part of the solvent contained in the enamel composition. Such drying is typically carried out at a temperature of between 120 and 180° C. Such drying is performed before step c (deposition of the refractory particles) and if necessary before step b1 (pre-firing, when it is performed before the deposition of the refractory particles).

Step c

Refractory particles are intended to mean particles that do not undergo any transformation during the bending (step d).

The refractory particles are based on oxides, carbides or metals.

The oxides are notably chosen from simple metal oxides, such as for example aluminum, titanium, or zirconium oxides, and complex oxides.

The complex oxides are notably chosen from silicates, glass or glass-ceramic frits with a high melting point (typically above 750° C.), or inorganic pigments. The pigments are for example solid solutions of transition metal oxides (chromium, iron etc.). They are called "complex inorganic color pigments" or CICPs.

The metals are, for example, selected from tungsten, titanium, molybdenum and refractory steels.

The silicates include alkaline earth silicates (such as magnesium silicates) or aluminum silicates.

The refractory particles have at least one dimension greater than or equal to 30 μm, in particular greater than or equal to 40 μm or 50 μm, or even 60 μm or 70 μm. They may even have at least one dimension greater than or equal to 100 μm, in particular 200 μm. The particles may be substantially spherical, in which case the dimension in question is the diameter. The particles can also be elongated, for example of a fibrous nature, and have a length/diameter ratio greater than 3, or even 10. In this case, the diameter can be less than 100 μm, even 50 μm, but the length is greater than or equal to 100 μm, even 200 μm or 500 μm.

It turned out that particles that were too small did not prevent bonding during the bending step. The chemical nature of the particles is also important to avoid the appearance of defects during bending. In a traditional bending method, the glass sheets are kept apart by placing an intercalated powder between them to ensure a gap of a few tens of micrometers, typically 20 to 50 μm. The interlayer powder is for example based on calcium and/or magnesium carbonate. Very fine (around 5 μm), it can however form agglomerates of a size higher than 10 μm. However, such a carbonate-based powder alone has proven to be ineffective in the present invention because, in addition to not preventing bonding, it reacts with the glaze during firing, ultimately resulting in a gray tint.

The refractory particles are deposited at least on the enamel layer, either after pre-firing the enamel (step b1) or before pre-firing the enamel (step c1).

The refractory particles may be deposited only on the enamel layer.

Alternatively, the refractory particles may be deposited on the enamel layer and on areas of the first glass sheet near the enamel layer or even on the entire surface of the glass sheet.

The amount of particles having at least one dimension greater than or equal to 30 μm (or greater than or equal to the preferred values mentioned above) is preferably at least 0.1 g/m$^2$, and particularly at least 0.5 g/m$^2$. Advantageously, it is at most 10 g/m$^2$.

The refractory particles may be deposited alone. Alternatively, the refractory particles can be deposited in a mixture with infrared radiation-absorbing elements. These absorbent elements may be of organic or mineral nature. These elements make it possible, during the pre-firing (step c1), to homogenize the temperature undergone in the different zones of the glass sheet and thus avoid the appearance of defects, for example optical distortions, in the zones of the glass located near the enamel. This effect is at its highest when the absorbent elements are deposited on the entire surface of the glass sheet or at least in the areas of the first glass sheet near the enamel layer. Alternatively, the absorbent elements can be deposited only on the enamel layer. It was observed in this case that the enamel had a blacker hue. The absorbent elements can be a resin, which will burn during the pre-firing step (c1). They may also be absorbent particles, such as pigments or carbon black. Carbon black is particularly preferred because of its ability to be burned off during pre-firing.

Refractory particles can be deposited by any means. In one embodiment, the particles are deposited by spraying or by sprinkling, particularly by means of a mesh. This case is particularly suitable when the particles are deposited alone. Large particles may also be deposited this way.

When the refractory particles are deposited in a mixture with absorbent elements such as those mentioned above, the mixture can be deposited by screen printing. In this case, the refractory particles are preferably smaller than 60 µm so as not to clog the openings of the screen-printing screen. In a preferred embodiment, step c comprises deposition by screen-printing of a mixture comprising an organic medium, the refractory particles and absorbent elements, particularly carbon black. This technique enables, for example, the deposition of absorbent elements on the entire surface of the glass sheet (when one seeks to homogenize the temperature undergone by the different areas of the glass sheet), or only on the enamel layer (which makes it possible to achieve more intense black tones for the enamel layer).

In one embodiment, the refractory particles are deposited directly on the enamel layer.

Step b2

According to another embodiment, the method comprises, between step b and step c, if necessary between step b1 and step c, a step b2 of depositing, solely on the enamel layer, an adhesion layer capable of fixing the refractory particles onto the enamel layer.

The adhesion layer allows the refractory particles to be temporarily attached to the enamel layer, and only to the enamel layer. The adhesion layer preferably coats the whole of the enamel layer.

The thickness of the adhesion layer is preferably between 5 and 25 µm.

The adhesion layer may also include absorbent elements as previously defined.

Preferably, after step c (particle deposition) and before step d (bending), the method comprises a step c2 of removing, particularly by blowing, the refractory particles other than those fixed by the adhesion layer. The particles that were deposited on the coating or on any uncoated areas of the first glass sheet in step c are then removed before the bending step. In this way, damage caused by particles to the coating or glass, such as scratches, is avoided.

When the pre-firing of the enamel layer (step c1) is performed between step c and step d, step c2 is normally performed before this step c1.

The adhesion layer is preferably organic-based, so that it can be removed either in step d (bending) or in step c1 (pre-firing, when it takes place after the deposition of the particles).

The adhesion layer is preferably deposited by screen-printing a composition comprising an organic medium and/or a resin and/or an organic adhesive.

The adhesion layer is preferably dried after the deposition of the particles (step c) and if necessary before step c2.

The method preferably comprises, between step d (bending) and step e (laminating), a step d1 of removing at least part, if not all, of the refractory particles, thus preventing the particles from getting into the laminated glass. Removal can be done by blowing or washing.

Pre-Firing Step (b1 or c1)

The pre-firing step is preferably carried out at a temperature comprised between 150 and 700° C., particularly between 550 and 680° C.

Such a pre-firing allows the removal of the organic medium, or in general any organic component that may be present in the enamel layer. If the pre-firing is performed after an adhesion layer has been deposited, the pre-firing also removes the adhesion layer in most cases.

During the pre-firing, the thin layer stack is at least partially dissolved by the enamel layer. Depending on the temperature used and the type of enamel or stack, the stack may even be completely dissolved by the enamel layer during the pre-firing. Alternatively, it may be only partially dissolved during pre-firing, and it is then completely dissolved during bending (step d).

According to one embodiment, the pre-firing step is performed between step b (deposition of the enamel layer) and step c (deposition of the refractory particles). It is then called step b1.

Preferably, the method of the invention then comprises in order step a, then step b (deposition of the enamel layer, preferably by screen printing), then optionally a step of drying the enamel layer, then step b1 (pre-firing), then optionally step b2 of depositing an adhesion layer (preferably by screen printing), then step c for depositing the refractory particles, then optionally a step for drying the adhesion layer, then optionally a step c2 for removing the refractory particles other than those fixed by the adhesion layer, then step d for bending, then optionally step d1 for removing the refractory particles, and finally step e for laminating.

According to another embodiment, the pre-firing step is performed between step c (refractory particle deposition) and step d (bending). It is then called step c1.

Preferably, the method of the invention then comprises in order step a, then step b (deposition of the enamel layer, preferably by screen printing), then optionally a step of drying the enamel layer, then optionally step b2 of depositing an adhesion layer (preferably by screen printing), then step c for depositing the refractory particles, then optionally a step for drying the adhesion layer, then optionally a step c2 for removing the refractory particles other than those fixed by the adhesion layer, then step c1 (pre-firing), then step d for bending, then optionally step d1 for removing the refractory particles, and finally step e for laminating.

Step d

Bending can be carried out using gravity, for example (the glass deforms under its own weight) or through pressing, at temperatures typically ranging from 550 to 650° C.

The glass sheets can be kept apart by placing an intercalated powder between them to ensure a gap of a few tens of micrometers, typically 20 to 50 µm. The interlayer powder is for example based on calcium and/or magnesium carbonate.

During the bending, the interior glass sheet (intended to be positioned inside the passenger compartment) is normally placed above the exterior glass sheet. Thus, during the bending step, the additional glass sheet is placed above the first glass sheet.

Preferably, after step d, the enamel layer is opaque with a black hue. The lightness L* thereof, measured in reflection on the side of the glass, is preferably less than 5. As indicated above, it advantageously forms a strip at the periphery of the first glass sheet. The enamel layer is thereby capable of hiding and protecting seals, connecting elements or else sensors from ultraviolet radiation.

If the enamel layer has not already completely dissolved the thin layer stack after the pre-firing, this is achieved during the bending process, which completes the enamel firing.

The total dissolution of the layer can be observed by electron microscopy, and results in a more neutral color in specular reflection, in particular by colorimetric coordinates a* and b* close to 0, in any case lower than 5.

Step e

The step of lamination may be carried out by treatment in an autoclave, for example at temperatures from 110 to 160° C. and under a pressure ranging from 10 to 15 bar. Prior to the autoclave treatment, the air trapped between the glass sheets and the lamination interlayer can be eliminated by calendering or by applying negative pressure.

As stated above, the additional sheet is preferably the interior sheet of the laminated glazing, i.e. the sheet located on the concave side of the glazing, intended to be positioned inside the passenger compartment. Thus, the coatings are arranged on face 2 of the laminated glazing.

The additional glass sheet may be made of soda-lime-silica glass or else of borosilicate or aluminosilicate glass. It may be made of clear or tinted glass. Its thickness is preferably between 0.5 and 4 mm, particularly between 1 and 3 mm.

According to a preferred embodiment, the additional glass sheet has a thickness of between 0.5 and 1.2 mm. The additional glass sheet is particularly made of sodium aluminosilicate, preferably chemically reinforced. The additional glass sheet is preferably the interior sheet of the laminated glazing. The invention is particularly useful for this type of configuration for which it is difficult to arrange the stack of thin layers on face 3. The chemical reinforcement (also referred to as "ion exchange") consists in bringing the surface of the glass into contact with a molten potassium salt (for example potassium nitrate) so as to reinforce the surface of the glass by exchanging ions of the glass (in this case sodium ions) with ions having a larger ionic radius (in this case potassium ions). This ion exchange makes it possible to form compressive stresses at the surface of the glass and over a certain thickness. Preferably, the surface stress is at least 300 MPa, particularly 400 and even 500 MPa, and at most 700 MPa, and the thickness of the zone under compression is at least 20 μm, typically between 20 and 50 μm. The stress profile can be determined in a known way using a polarizing microscope fitted with a Babinet compensator. The chemical tempering step is preferably carried out at a temperature ranging from 380 to 550° C., and for a duration ranging from 30 minutes to 3 hours. The chemical reinforcement is preferably carried out after the bending step but before the lamination step. The glazing obtained is preferably a motor vehicle windscreen, in particular a heating windscreen.

According to another preferred embodiment, the additional glass sheet carries, on the face opposite the face which is facing the lamination interlayer (preferably face 4, the additional sheet being the interior sheet), an additional stack of thin layers, particularly a low-emissivity stack, comprising a transparent conductive oxide, particularly indium tin oxide (ITO). The invention is also particularly useful for this type of configuration for which it is tricky to arrange the stacks of thin layers on both faces of the same glass sheet (face 3 and 4). In this embodiment, the lamination interlayer and/or the additional glass sheet is preferably tinted, the glass sheet carrying the coatings being able to be made of clear glass. The glazing obtained is preferably a motor vehicle roof.

As an example of the latter preferred embodiment, mention may be made of a laminated curved roof comprising, from the outside of the vehicle, a clear glass sheet coated on face 2 with a stack of thin layers comprising at least one silver layer then an enamel layer, a lamination interlayer made of tinted PVB, and an additional glass sheet made of tinted glass, carrying, on face 4, a low-emissivity stack of thin layers, particularly based on ITO.

The lamination interlayer preferably comprises at least one sheet of polyvinyl acetal, particularly polyvinyl butyral (PVB).

The lamination interlayer can be tinted or untinted in order, if necessary, to regulate the optical or thermal properties of the glazing.

The lamination interlayer may advantageously have acoustic absorption properties in order to absorb airborne or structure-borne sounds. To this end, it may particularly consist of three polymeric sheets, including two "external" PVB sheets surrounding an internal polymeric sheet, optionally made of PVB, with a lower hardness than that of the outer sheets.

The lamination interlayer may also have thermal insulation properties, in particular properties of infrared radiation reflection. To this end, it may comprise a coating of thin layers with low-emissivity, for example a coating comprising a thin layer of silver or a coating alternating dielectric layers with different refractive indices, deposited on an internal PET sheet surrounded by two external PVB sheets.

The thickness of the lamination interlayer is generally within a range extending from 0.3 to 1.5 mm, particularly from 0.5 to 1 mm. The lamination interlayer can have a smaller thickness on an edge of the glazing than at the center of the glazing in order to prevent the formation of a double image in the case of using a head-up display (HUD).

EXAMPLES

The following exemplary embodiments illustrate the invention in a non-limiting manner, in connection with FIGS. 1 to 4, wherein:

FIG. 1 schematically illustrates one embodiment of the method according to the invention.

FIG. 2 schematically illustrates another embodiment of the method according to the invention.

FIG. 3 schematically illustrates another embodiment of the method according to the invention.

FIG. 4 schematically illustrates another embodiment of the method according to the invention.

These figures show a schematic cross-section of a portion of the glass sheets and the elements deposited on the glass sheets near the periphery thereof. The various elements are obviously not represented to scale, so that they can be visualized.

The first glass sheet 10 coated with the thin film stack 12 is provided in step a, and then part of the stack 12 is coated with an enamel layer 14, in particular by screen printing (step b).

In the embodiment of FIGS. 1 and 3, the assembly then undergoes a pre-firing (step b1), which in the illustrated case leads to a partial dissolution of the stack 12 by the enamel 14.

In the embodiment shown in FIG. 1, refractory particles 16 are then deposited on the enamel layer 14 and on the stack 12 (step c).

An additional glass sheet 20, herein provided with a further thin layer stack 22, is then placed on the first glass sheet 10, the assembly then being curved (step d). As the view shown is only from the end of the glass sheet, the curvature is not shown here. The diagram illustrates that, after bending, the enamel 14 has completely dissolved the underlying thin layer stack 12.

In step e, the first glass sheet 10 coated with the thin film stack 12 and the enamel layer 14 and the additional glass sheet 20 coated with the additional stack 22 are joined together with the aid of the laminating interlayer 30. The diagram shows each of the elements separately, in exploded view. The particles 16 were previously removed in a step d1 not shown.

The embodiment of FIG. 2 differs from that of FIG. 1 in that the pre-firing step (step c1) is performed after step c of depositing the refractory particles 16, and before step d of bending.

The embodiments of FIGS. 3 and 4 add a step b2 of depositing an adhesive layer 18 as well as a step c2 of removing refractory particles 16 other than those fixed onto the enamel layer 14. Thus, in step c, the particles 16 deposited on the enamel layer 14 are fixed onto the enamel layer 14, and in step d of bending, only the particles 16 fixed onto the enamel layer 14 are present.

The embodiment of FIG. 4 differs from that of FIG. 3 in that the pre-firing step (step c1) is performed after step c of depositing the refractory particles 16, and before step d of bending.

Example 1

The method carried out by Example 1 corresponds to the embodiment of FIG. 1.

Glass sheets 2.1 mm thick, coated beforehand by cathode sputtering of a stack of thin layers comprising two silver layers protected by zinc oxide layers, silicon nitride layers and NiCr blockers, were coated by screen printing with enamel layers with a wet thickness of 25 µm.

After drying (150° C., 1 to 2 minutes) and then pre-firing at 630° C., particles were dispersed over the entire surface of the first glass sheet, including the pre-fired enamel layer.

These particles were based on magnesium silicate, obtained by grinding fibers marketed under the reference Isofrax® 1260C. The particles obtained were less than 50 µm in diameter and at least 1 mm in length.

After pairing with an additional glass sheet of soda-lime glass with a stack comprising an ITO layer on face 4, the assembly was curved at over 600° C. for 350 to 500 seconds. After washing to remove refractory particles, the two glass sheets were laminated together with a PVB interlayer.

After firing, the appearance, more particularly the black color viewed from face 1, was evaluated by measuring the lightness L* in reflection (illuminant D65, reference observer 10°). A value below 5 is considered acceptable. The bonding was evaluated qualitatively by visual observation.

The value of L* was less than 4.8 for a bending temperature above 628° C., and 3.6 for a bending temperature of 651° C. No bonding was observed up to a bending temperature of 651° C.

Example 2

The method carried out by Example 2 corresponds to the embodiment of FIG. 3.

In step b2, a resin (Ferro 80-007 medium) was deposited by screen-printed onto the enamel layer, with a wet thickness of 10 to 15 µm. The resulting adhesive layer was then dried at about 150° C. for 1-2 minutes to remove the solvent. Refractory particles not attached to the enamel by the adhesive layer were then air-blown away. The other steps were performed in the same way as for Example 1.

The same results in terms of aesthetics and lack of bonding as in Example 1 were obtained. On the other hand, no scratches were observed on the stack of thin films, unlike in Example 1.

Example 3

The method carried out by Example 3 corresponds to the embodiment of FIG. 4. The only difference from Example 2 was the order of the steps, as the particles were deposited on a dried enamel layer, with the pre-firing performed just prior to bending.

The same results in terms of aesthetics and lack of bonding as in Example 2 were obtained. Likewise, no scratches were observed on the stack of thin films, unlike in Example 1.

Comparative Example C1

In this example, and compared to Example 1, the deposition of refractory particles has been replaced by the screen printing of a 25 µm bismuth enamel with non-stick properties.

However, bonding was observed, and in addition the value of L* was greater than 5 for all the bending temperatures studied.

Comparative Example C2

In this example, and compared to Example 1, the deposition of refractory particles has been replaced by the deposition of black pigments with a size smaller than 20 µm.

Though no bonding was observed, the L* value was at least 12.4 (value observed for a bending temperature of 650° C.).

Comparative Example C3

In this example, and compared to Example 1, the deposition of refractory particles has been replaced by the deposition of white pigments with a size smaller than 20 µm.

Though no bonding was observed, the L* value was at least 20.

Comparative Example C4

In this example, and compared to Example 1, the deposition of refractory particles has been replaced by the screen printing of a silica sol-gel layer (Product TLU0059 from Ferro).

The aesthetics were satisfactory (L*<5, particularly 3.3 for a bending temperature of 654° C.), but bonding was observed.

Comparative Example C5

In this example, and compared to Example 1, the deposition of refractory particles has been replaced by deposition by screen-printing of an alkali silicate based solution additionally comprising black pigments.

The L* value was 16 for a bending temperature of 650° C., and a transfer of the silicate layer to the additional glass sheet was observed.

Comparative Example C6

In this example, and compared to Example 1, the deposition of refractory particles has been replaced by the silk-screen deposition of a 25 μm bismuth enamel, marketed under the reference 14316 by the company Ferro, known for its non-stick properties. In contrast to Example C1, a second pre-firing treatment was performed after this enamel was deposited.

However, bonding was observed, and in addition the L* value was 8.9 for a bending temperature of 650° C.

The invention claimed is:

1. A method for obtaining a laminated curved glazing, comprising:
    a. providing a first glass sheet, coated on at least part of one of the faces thereof with a stack of thin layers,
    b. a step of depositing, on part of the surface of the stack of thin layers, an enamel layer,
    c. a step of depositing, at least on said enamel layer, refractory particles based on oxides, carbides or metals, at least one dimension of which is greater than or equal to 30 μm,
    d. a step of simultaneously bending the first glass sheet and an additional glass sheet, with the enamel layer facing said additional glass sheet,
    e. a step of laminating said first glass sheet with the additional glass sheet by a lamination interlayer, such that the enamel layer is facing said interlayer,
    said method further comprising a step of pre-firing the enamel layer during which the stack of thin layers located under the enamel layer is at least partially dissolved by said enamel layer, said pre-firing step being either a step b1 performed between step b and step c or a step c1 carried out between step c and step d, the stack of thin layers located under the enamel layer being completely dissolved by said enamel layer at least by the end of step d,
    wherein the refractory particles are deposited in a mixture with infrared radiation absorbent elements.

2. The method according to claim 1, wherein the stack of thin layers comprises at least one functional layer.

3. The method according to claim 2, wherein the at least one functional layer is an electrically conductive functional layer that is a metal layer or a layer of a transparent conductive oxide.

4. The method according to claim 3, wherein the metal layer is a silver or niobium layer and the layer of a transparent conductive oxide is a layer of indium tin oxide, doped tin oxide or doped zinc oxide.

5. The method according to claim 1, wherein after step d, the enamel layer is opaque, has a black hue, and forms a strip at the periphery of the first glass sheet.

6. The method according to claim 1, wherein the refractory particles are based on oxides selected from simple metal oxides and complex oxides, high-melting glass or glass-ceramic frits, or inorganic pigments.

7. Method according to claim 6, wherein the simple metal oxides include aluminum, titanium or zirconium oxide, and the complex oxides include silicates.

8. The method according to claim 1, wherein the refractory particles have at least one dimension greater than or equal to 40 μm.

9. The method according to claim 8, wherein the at least one dimension is greater than or equal to 60 μm.

10. The method according to claim 1, wherein the refractory particles are elongated, and have a length/diameter ratio greater than 3.

11. The method according to claim 1, wherein an amount of particles having at least one dimension greater than or equal to 30 μm is at least 0.1 g/m$^{2.}$ 12. The method according to claim 1, wherein the refractory particles are deposited on the enamel layer and on areas of the first glass sheet near the enamel layer.

13. The method according to claim 1, comprising between step b and step c, or between step b1 and step c, a step b2 of depositing, solely on the enamel layer, an adhesion layer capable of fixing the refractory particles onto the enamel layer.

14. The method according to claim 13, further comprising, after step c and before step d, a step c2 of removing refractory particles other than those fixed by the adhesion layer.

15. The method according to claim 1, further comprising, between step d and step e a step d1 of removing the refractory particles.

16. The method according to claim 1, wherein the additional glass sheet has a thickness of between 0.5 and 1.2 mm.

17. The method according to claim 1, wherein the additional glass sheet carries, on the face opposite the face facing the lamination interlayer, an additional stack of thin layers.

18. A laminated curved glazing capable of being obtained by the method of claim 1.

19. The method according to claim 1, wherein the laminated curved glazing is a motor vehicle windscreen or roof.

20. The method according to claim 1, wherein the infrared radiation absorbent elements include a resin, pigments or carbon black.

* * * * *